(12) United States Patent
Biswas et al.

(10) Patent No.: US 7,903,661 B2
(45) Date of Patent: *Mar. 8, 2011

(54) MECHANISMS FOR PROVIDING INTELLIGENT THROTTLING ON A NAT SESSION BORDER CONTROLLER

(75) Inventors: Kaushik P. Biswas, San Jose, CA (US); Vinay Jayant Pande, San Jose, CA (US); Jayesh Chokshi, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 12/499,037

(22) Filed: Jul. 7, 2009

(65) Prior Publication Data

US 2009/0274150 A1   Nov. 5, 2009

Related U.S. Application Data

(63) Continuation of application No. 11/559,591, filed on Nov. 14, 2006, now Pat. No. 7,561,575.

(51) Int. Cl.
   *H04L 12/56* (2006.01)
   *G06F 15/173* (2006.01)
   *H04J 3/16* (2006.01)
(52) U.S. Cl. ............. 370/392; 370/389; 370/395.2; 370/401; 370/465; 709/224; 709/228
(58) Field of Classification Search ......... 370/233–244, 370/352–356, 389–392, 400–465, 395.2; 709/219–228; 340/825.22
See application file for complete search history.

(56) References Cited

U.S. PATENT DOCUMENTS

| | | | |
|---|---|---|---|
| 6,717,949 B1 * | 4/2004 | Boden et al. | 370/401 |
| 7,380,011 B2 * | 5/2008 | Li et al. | 709/227 |
| 7,424,033 B2 * | 9/2008 | Kwak | 370/466 |
| 7,561,575 B2 | 7/2009 | Biswas et al. | |

(Continued)

OTHER PUBLICATIONS

Schulzrinne, H. et al., "RTP Payload for DTMF Digits, Telephony Tones and Telephony Signals," Network Working Group, RFC 2833, May 2000, pp. 1-24, http://www.faqs.org/rfcs/rfc2833.html.

(Continued)

*Primary Examiner* — Afsar M. Qureshi
(74) *Attorney, Agent, or Firm* — Weaver Austin Villeneuve & Sampson LLP

(57) ABSTRACT

Disclosed are apparatus and methods for managing session data in a session border controller (SBC), where the session data is sent from a first node, such as a first phone, to a second node, such as a registrar or second phone. In one example embodiment, the following operations are performed in a first intermediary node that is configured to provide network address translation (NAT) for both a header and payload of a session packet and has an inside interface coupled with a second intermediary node that is configured to perform NAT for only a header of session packets. It is determined whether an end node is sending session packets that are not used to set up a session and that result in a binding that was formed by the second intermediary node being retained. The binding associates inside and outside addresses of the end node, and an end node is defined as a node that originates a session packet. It is determined whether to inhibit a registration throttling process from being performed by the first intermediary node, that results in the binding being retained, based on whether it is determined that the end node is sending session packets that are not used to set up a session and that result in the binding being retained.

17 Claims, 9 Drawing Sheets

U.S. PATENT DOCUMENTS

| | | | |
|---|---|---|---|
| 2004/0240389 A1* | 12/2004 | Bessis et al. | 370/252 |
| 2006/0200547 A1 | 9/2006 | Edwards et al. | |
| 2007/0078986 A1 | 4/2007 | Ethier et al. | |
| 2007/0226361 A1 | 9/2007 | Shaikh et al. | |
| 2007/0253418 A1* | 11/2007 | Shiri et al. | 370/392 |
| 2007/0291733 A1 | 12/2007 | Doran et al. | |
| 2008/0019370 A1 | 1/2008 | Riley | |
| 2008/0298237 A1* | 12/2008 | Dos Remedios et al. | 370/233 |

OTHER PUBLICATIONS

Rosenberg, J. et al., "SIP: Session Initiation Protocol," Network Working Group, RFC 3261, Jun. 2002, pp. 1-211, http://www.faqs.org/rfcs/rfc3261.

Hautakorpi, J. et al., "SIP—Unfriendly Functions in Current Communication Architectures," SIPPING Working Group, Internet Draft, Jul. 18, 2005, pp. 1-9, http://tools.ietf.org/id/draft-camarillo-sippig-sbc-funcs-01.txt.

Hautakorpi, J. et al., "SIP—Unfriendly Functions in Current Communication Architectures," SIPPING Working Group, Internet Draft, Sep. 26, 2005, pp. 1-12, http://tools.ietf.org/id/draft-camarillo-sipping-sbc-funcs-02.txt.

Rosenberg, J. et al., "Considerations for Selection of Techniques for NAT Traversal," Network Working Group, Internet Draft, Feb. 13, 2005, pp. 1-20, http://tools.ietf.org/html.draft-iab-nat-traversal-consideratins-00.

"Session Border Controllers: Delivering Interactive Communications Across IP Network Borders," Acme Packet Inc., White Paper, Feb. 19, 2003, pp. 1-11, http://www.acmepacket.com.

Overview of Cisco Multiservice IP-to-IP Gateways, Cisco Multiservice IP-to-IP Gateway Application Guide, 2006, 21 pages.

Functionality of Existing Session Border Controller (SBC), Network Working Group, Internet Draft, Feb. 2005, pp. 1-9, http://polyphase.ca/drafts/draft-camarillo-sipping-sbc-funcs-00.html.

U.S. Appl. No. 11/511,629, filed Aug. 28, 2006.

Notice of Allowance dated Mar. 30, 2009 for U.S. Appl. No. 11/559,591.

* cited by examiner

MECHANISMS FOR PROVIDING INTELLIGENT THROTTLING ON A NAT SESSION BORDER CONTROLLER

CROSS REFERENCE TO RELATED PATENT APPLICATION

This application is a continuation and claims priority of U.S. patent application Ser. No. 11/559,591, entitled MECHANISMS FOR PROVIDING INTELLIGENT THROTTLING ON A NAT SESSION BORDER CONTROLLER by Kaushik P. Biswas et al., filed Nov. 14, 2006. This application is incorporated herein by reference in its entirety.

BACKGROUND OF THE INVENTION

The present invention relates to methods and apparatus for processing session data within a computer network.

Session Border Controllers (SBC's) are becoming increasingly popular for facilitating devices on either sides of the Session Border Controllers to remain unaware of each others' existence, particularly in Session Initiation Protocol (SIP) deployments whereby the inside user-agents (UAs) are configured with the SBC's inside-address as its proxy/registrar address and directs all signaling traffic to the SBC, which in turn ensures that this traffic reaches the actual proxy/registrar (as configured in its database) and vice-versa.

There are solutions like IP-IP GW that terminate and regenerate sessions at the SBC. When a call signaling packet is received from a first end node at the SBC, the SBC performs several operations that require a significant amount of resources, especially as the number of sessions handled by such SBC increases. For each call signaling flow, the SBC closes and manages the stack associated with the session that is conducted between the first end node and the SBC and also creates and manages a new stack for the session that is conducted between the SBC and the second end node. That is, another socket needs to be opened for the session between the SBC and the second node.

DESCRIPTION OF EXAMPLE EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Overview

In one example embodiment, the following operations are performed in a first intermediary node that is configured to provide network address translation (NAT) for both a header and payload of a session packet and has an inside interface coupled with a second intermediary node that is configured to perform NAT for only a header of session packets. It is determined whether an end node is sending session packets that are not used to set up a session and that result in a binding that was formed by the second intermediary node being retained. The binding associates inside and outside addresses of the end node, and an end node is defined as a node that originates a session packet. It is determined whether to inhibit a registration throttling process from being performed by the first intermediary node, that results in the binding being retained, based on whether it is determined that the end node is sending session packets that are not used to set up a session and that result in the binding being retained. In another embodiment, the invention pertains to a first intermediary apparatus having one or more processors and one or more memory. At least one of the processors and memory are adapted for performing the above-described method operations.

Example Implementations

Figure 1:
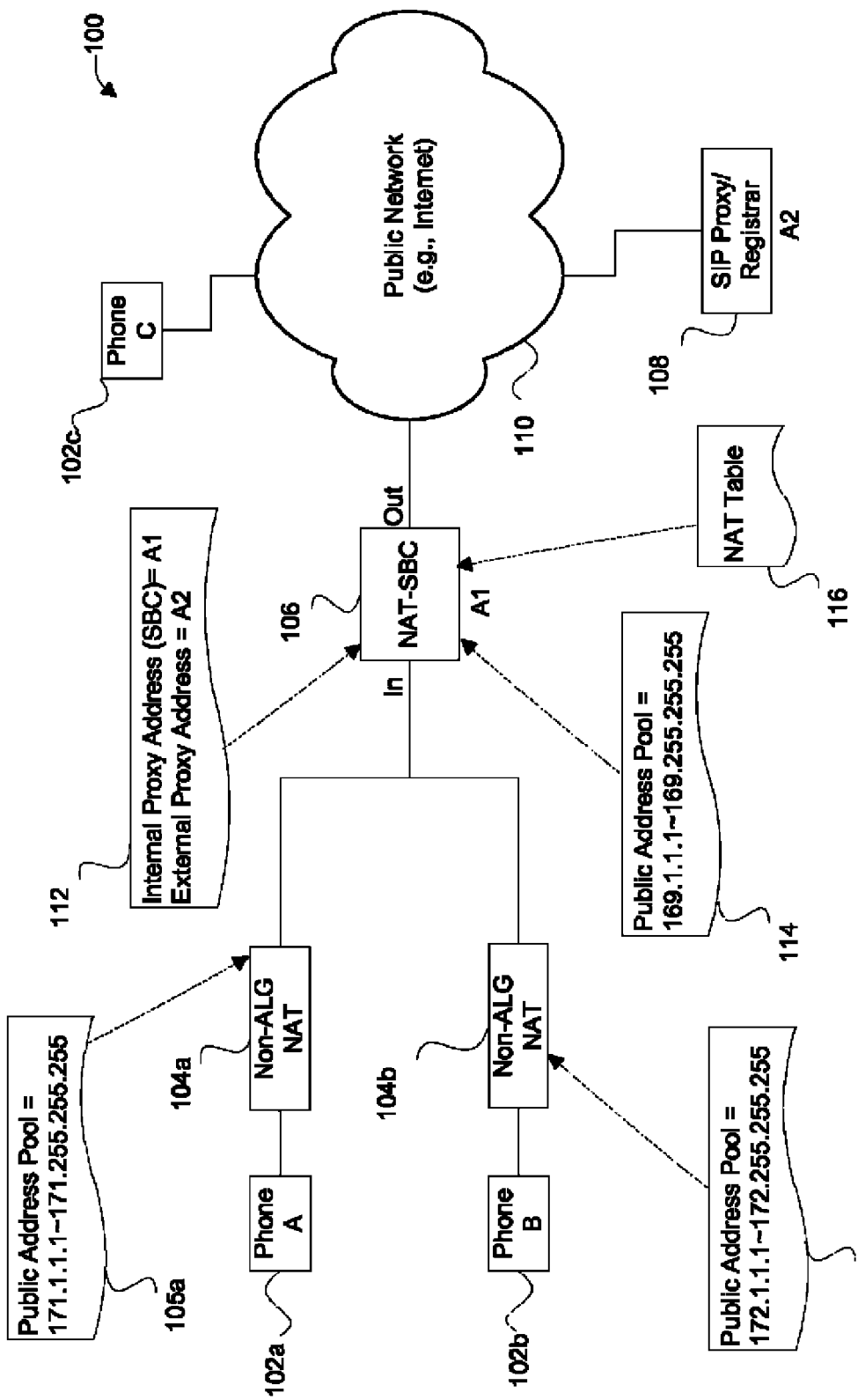
FIG. 1 is an example network in which example embodiments of the present invention may be implemented.

FIG. 1 is a network in which embodiments of the present invention may be implemented. Phone A (102a) and phone B (102b) are each configured to originate and send session data to a NAT-SBC 106 through their individual Non-ALG NAT devices 104a and 104b, respectively. Although embodiments of the present invention are herein described as being applied to session packets sent between a phone device and an outside device, such as a phone or registrar device, the session packets may originate from any suitable type of end node, such as a computer desktop, personal digital assistant (PDA), portable computer, etc. In general, an end node does not have to serve as a physical termination device that is not coupled to any other devices, besides the home-router or Non-ALG NAT. An end node may be defined as a node that originates a session packet, in contrast to a node that merely passes a session packet from one node to another node.

Although each Non-ALG NAT 104 does not include mechanisms for analyzing and translating embedded addresses, each Non-ALG NAT is associated with its own public address pool to be utilized to translate a header's inside private addresses into public addresses, and visa versa. As shown, public address pool 105a having address range 171.1.1.1 through 171.255.255.255 is associated with Non-ALG NAT 104a, while public address pool 105b having address range 172.1.1.1 through 172.255.255.255 is associated with Non-ALG NAT 104b. Bindings between public and private addresses for a particular end node or phone may be stored in a NAT Table (not shown) associated with the particular end node's Non-ALG NAT 104.

In general, NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may be a duplicate of an IP address that is used within another local network.

When a local computer attempts to communicate with a computer outside the local network, the intermediary device maps the local computer's IP address to one of the intermediary device's assigned globally unique IP addresses. The intermediary device than replaces the local computer's address with this globally unique IP address enabling the local computer to communicate with the outside computer. If the intermediary device is assigned only one globally unique IP address, then it needs to share this globally unique IP address amongst all the local computers for which it is acting as an agent. Thus the intermediary device would need to modify the TCP/UDP ports for the traffic from the local computers such that it can uniquely map the tuple (local address, local TCP/UDP port number) to the globally unique IP address and assigned TCP/UDP port number. This is called network address port translation (NAPT). The term NAT is used herein in a generalized form to mean both network address translation (NAT) and network address port translation (NAPT).

The NAT-SBC 106 is also configured to translate addresses in the header based on a proxy binding 112 and a public address pool 114, as well as to translate addresses embedded in the payload based on proxy binding 112 and public address pool 114. The proxy binding includes an Internal Proxy address A1 assigned to the NAT-SBC and an External Proxy address A2 assigned to a proxy or registrar device 108. The NAT-SBC is configured to serve as a proxy for the actual proxy or Registrar 108. Accordingly, session data from each phone is typically directed to the NAT-SBC's address A1 and then the NAT-SBC forwards such session data to the actual proxy or registrar device 108 after the session data is processed as explained further below. Typically, the NAT-SBC has its own domain in the range 169.1.1.1 through 169.255.255.255. Thus, the NAT-SBC may also be configured to translate public addresses generated by each Non-ALG NAT into public addresses from its public address pool 114 having a range between 169.1.1.1 and 169.255.255.255. Bindings between inside and outside addresses with respect to the NAT-SBC may be stored in a NAT Table 116 associated with NAT-SBC 106.

While phones A and B may be coupled to the inside NAT-SBC 106, other phones, such as phone C (102c), may be coupled with the outside interface of such NAT-SBC 106, for example, via one or more local network(s) and public networks (e.g., Internet 110). SIP Proxy or Registrar 108 is also coupled with public network 110 although any suitable registrar device for managing sessions may be utilized, depending on the particular call signaling protocol.

In general, the NAT-SBC may be configured to translate the header and payload of session packets so as to not terminate and generate each session. The NAT-SBC translates the appropriate addresses in the packet and then forwards the translated packet towards its destination. An address translation as discussed herein may include translation of an IP address and/or a port value. The translation can be performed so as to not affect other portions of the packet and, therefore, most of the packet information is maintained upon forwarding. Since the translated and forwarded packet retains most of its information in this example, security and other information may also be reliably maintained. This translation and forwarding scheme may be accomplished in any suitable manner.

Figure 2A:
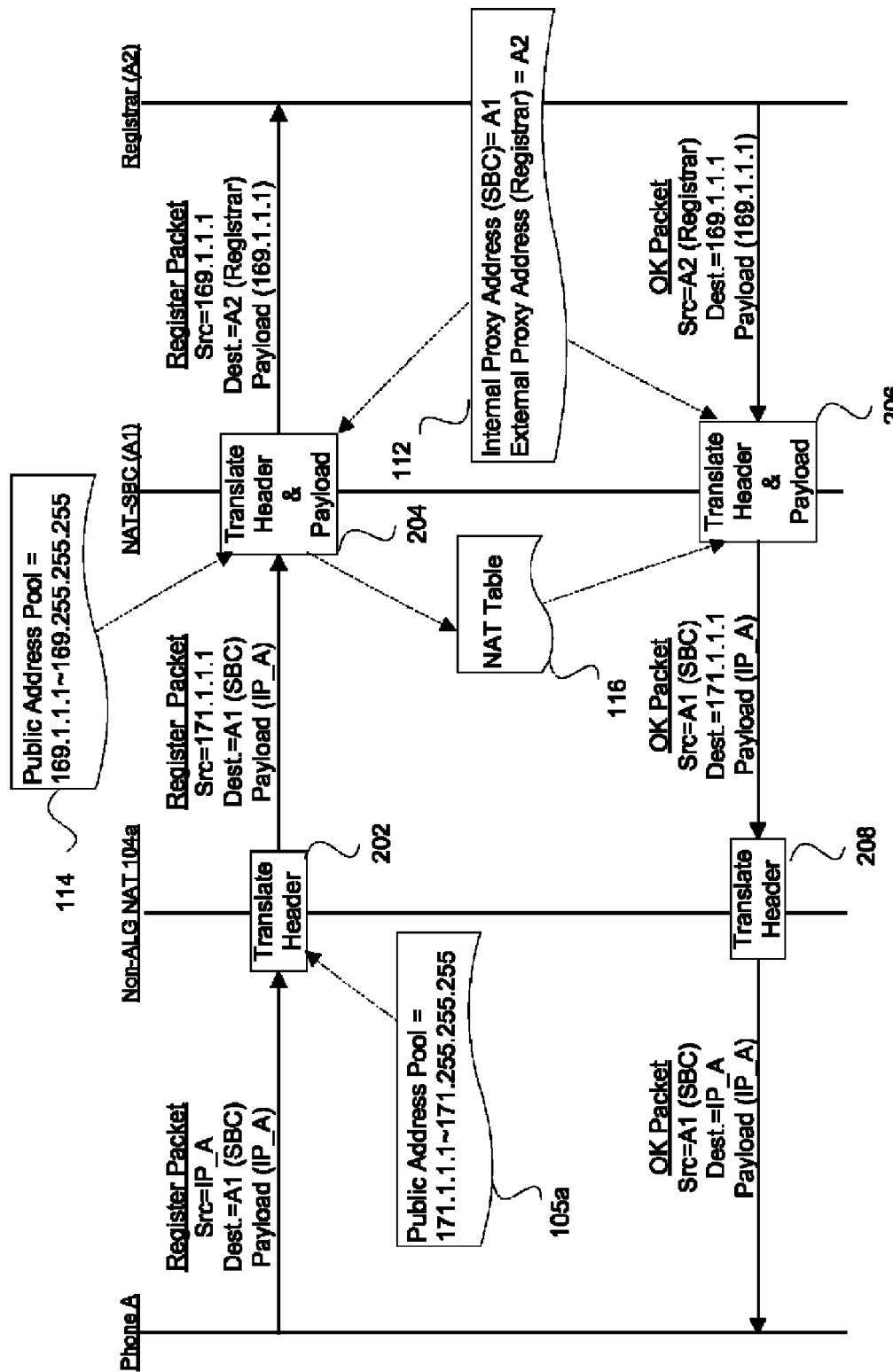
FIGS. 2A and 2B illustrate example communication diagrams for registering phone A and phone B.
Figure 2B:
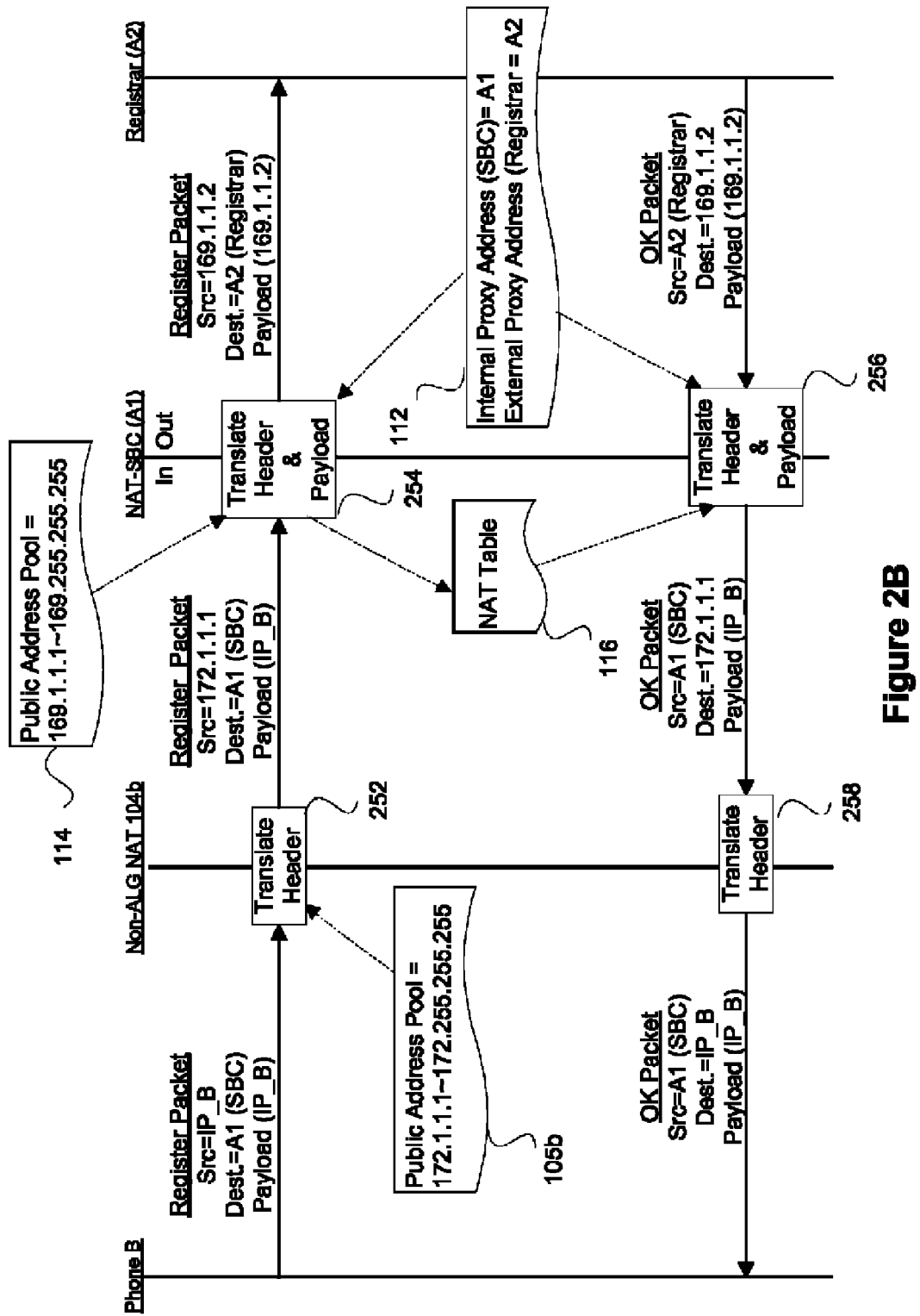

FIGS. 2A and 2B illustrate communication diagrams for registering phone A and phone B, respectively, in accordance with one implementation of the present invention. As shown in FIG. 2A, phone A sends a register packet having a source address equal to IP_A and a destination address equal to A1, which is the address of the NAT-SBC 106 of FIG. 1. The source address IP_A of phone A is also contained within the payload, e.g., as a caller identifier.

The Non-ALG NAT 104a receives this register packet and then translates only the header in operation 202. Accordingly, the register packet now has a source address equal to 171.1.1.1, which with obtained from the public address pool 105a of the Non-ALG NAT 104a. The Non-ALG NAT does not translate any addresses in the payload. The source address IP_A, which is the private address for phone A, remains untranslated in the payload.

This register packet is then received by the NAT-SBC 106. The NAT-SBC then translates the header and payload addresses in operation 204. Translation of the header destination address is accomplished based on a binding 112 between an internal proxy address for the NAT-SBC that is equal to A1 and an external proxy address for the registrar that is equal to A2. The proxy binding 112 can be preconfigured in the NAT-SBC or configured using any suitable command interface (e.g., command language interface or CLI). Translation of the header source from 171.1.1.1 to 169.1.1.1 is based on the public address pool 114 of the NAT-SBC.

A public address that is generated by the Non-ALG NAT and is received in a packet on an inside interface of the NAT-SBC is referred to as a public-inside address, while the public address that is generated by the NAT-SBC and output in a packet from the outside interface of the NAT-SBC is referred to as public-outside address. At any time during this translation and/or forwarding process, one or more binding(s) are also formed in one or more NAT Table(s), e.g., table 116, so as to associate phone A's private address, public-inside address, and public-outside address.

The payload of the register packet that is received into the inside interface of the NAT-SBC is also translated from the private address for phone A into the public-outside address for phone A that was obtained from the public address pool 114. The translated register packet is output from the outside interface of NAT-SBC to the registrar. This translated and forwarded register packet now has a source address equal to 169.1.1.1 (obtained from public address pool 114), a destination equal to A2 (which corresponds to the registrar), as well as a public-outside address 169.1.1.1, which corresponds to phone A in the payload. Substantially all of the remaining, portions of the register packet remain unchanged thereby retaining significant information, such as credential information.

After the registrar receives this translated register packet, the registrar then sends an OK packet having a source address equal to A2 and a destination address equal to 169.1.1.1, which corresponds to the public address for phone A. The registrar retains the association between the phone A's public address and other calling information, such as a phone number for phone A. The OK packet also contains public address information for phone A within the payload.

The NAT-SBC receives this OK packet and translates the header and payload in operation 206 based on one or more binding(s) previously stored in the NAT table 116 for phone A, as well as proxy binding 112. The NAT-SBC then outputs the OK packet having a source address equal to A1 and a destination address equal to 171.1.1.1, which corresponds to the public-inside address for phone A. The payload now contains only private address IP_A for phone A. The NAT-SBC has translated the destination address from its public-inside address for phone A, while it has translated the payload address for phone A into its corresponding private address. This is done so that the Non-ALG NAT only has to translate the header and not the payload.

This OK packet is received by the Non-ALG NAT 104a, which merely translates the header in operation 208. Accordingly, the OK packet then has a source address equal to A1 and a destination address equal to IP_A. The private address IP_A in the payload remains untranslated by the Non-ALG NAT 104a. This translated OK packet is sent to phone A.

As shown in FIG. 2B, phone B sends a register packet having a source address equal to IP_B and a destination address equal to A1, which corresponds to the NAT-SBC. The private address IP_B for phone B is also contained in the payload in one or more fields depending on the particular application utilized. The Non-ALG NAT 104b then receives this register packet from phone B and translates the header in operation 252. The register packet then has a source address equal to 172.1.1.1, which was obtained from the public address pool 105b for Non-ALG NAT 104b. The private address for phone B IP_B remains untranslated in the payload.

The NAT-SBC then receives this register packet and translates the header and payload in operation 254. The register packet then contains a source address equal to 169.1.1.2, which was obtained from the public address pool 114, and destination address equal to A2 (for registrar), as well as public address 169.1.1.2 for phone B in the payload.

This register packet is received by the registrar. The registrar then sends an OK packet having a source address equal to A2, a destination address and payload address equal to 169.1.1.2 that corresponds to phone B. The NAT-SBC receives this OK packet and translates the header and payload in operation 256. The translated OK packet that is sent from the NAT-SBC then contains source address equal to A1 and a destination address equal to 172.1.1.1, as well as a private address IP_B for phone B within the payload. The Non-ALG NAT 104b then translates only the header and not the payload address in operation 258. It should be noted that the Non-ALG NAT 104b does not have to translate the payload address because the NAT-SBC has already handled such embedded address. The final OK packet then contains a source address equal to A1, and a destination and payload address equal to IP_B. This OK packet is received by phone B.

In order to retain or "keep alive" the NAT entries at a Non-ALG NAT, the NAT-SBC (A1) can force very frequent Registrations from the inside devices, e.g., phones A and B and such a process is referred to herein as a Registration Throttling process. However, many phones themselves send NAT keep-alives, e.g., in the form of a short SIP packet such as NOTIFY, to keep the pinhole on the Non-ALG NAT alive. Thus, invariably there can be situations where both the NAT-SBC and the inside device have their own NAT keep-alive mechanisms turned ON, thus causing excessive messaging to flow thru the NAT-SBC. These two sources of packets to retain the NAT entries in a Non-ALG NAT might cause performance issues on the NAT-SBC.

Embodiments of the present invention may, therefore, include an intelligent mechanism to discover such excessive keep-alive conditions and thereby reduce the amount of messaging between the Non-ALG NAT, NAT-SBC and the actual Registrar. This mechanism can result in a more efficient Session Border Controller.

In one example SIP implementation, the session packets (except the call-flow SIP packets like Register, Invite, 200 Ok, etc.) from an end node are monitored to determine whether the end node is implementing its own keep-alive mechanism. If it is determined that the end node is using its own keep-alive mechanism, the Registration Throttling process may be inhibited. If the end node is not using such a keep-alive mechanism, the Registration Throttling may continue or resume. In certain embodiments, instead of determining dynamically whether an end node is performing a keep-alive mechanism, the network-administrator can be allowed to statically configure an end node (e.g., phone) as not needing Registration Throttling since such end node is utilizing a keep-alive mechanism. If such a static method is selected for a particular end node, the dynamic sensing of a keep-alive mechanism for such end node can be inhibited or not performed.

Figure 3A:
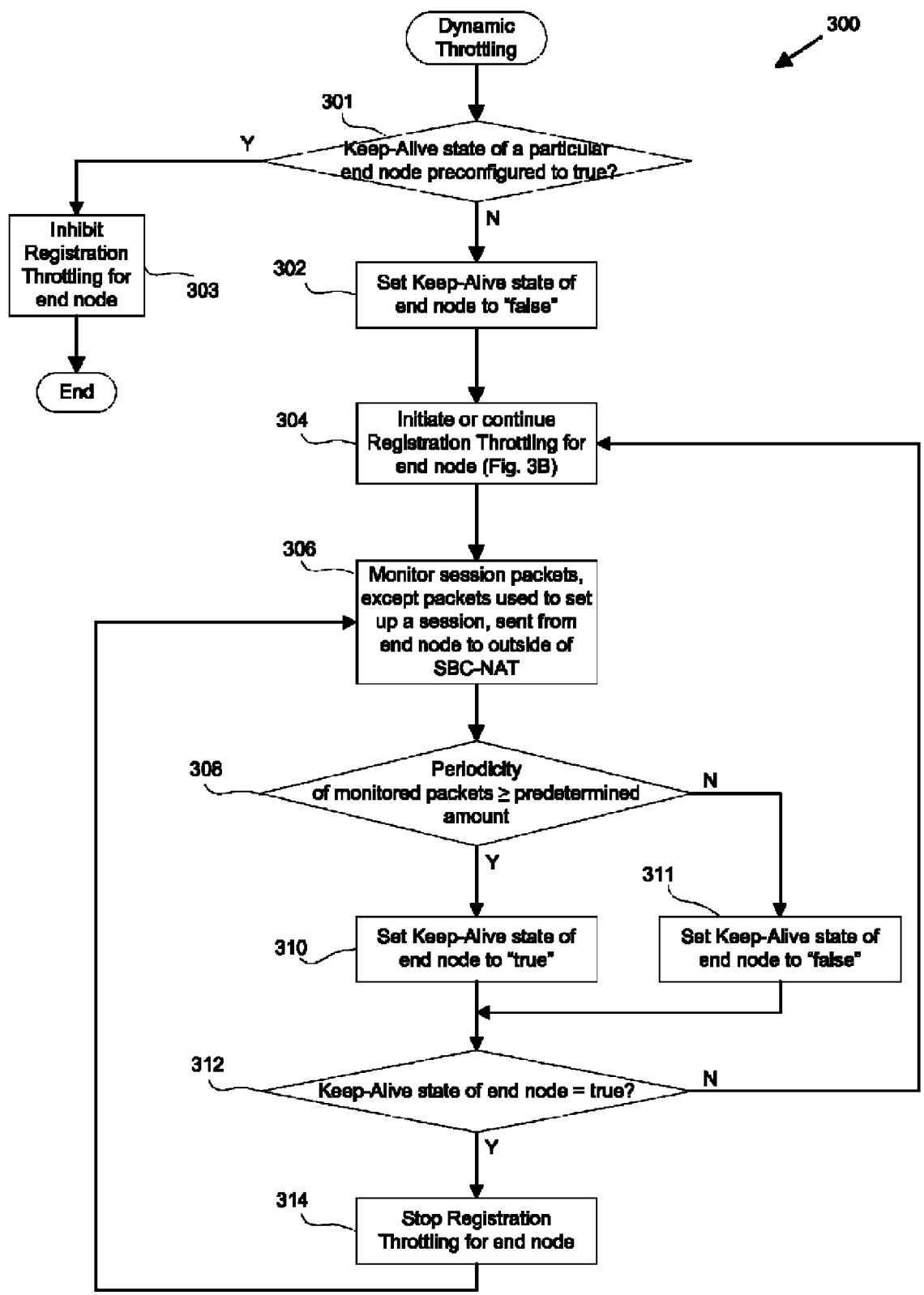
FIG. 3A is a flowchart illustrating a dynamic throttling procedure in accordance with one example embodiment of the present invention.

A dynamic throttling process, that is static and/or implements monitoring, can be performed in any suitable manner. FIG. 3A is a flowchart illustrating a dynamic throttling procedure 300 in accordance with one embodiment of the present invention. This dynamic throttling procedure is performed with respect to a particular inside end node, such as a particular user agent (UA) or phone device. However, this process 300 can be implemented for any number of end nodes.

Initially, it may be determined whether a Keep-Alive state of a particular end node is preconfigured to "true" in operation 301. For example, a list of end nodes, e.g., phones, which implement a keep-alive feature, may be preconfigured in (or accessible by) the NAT-SBC 106. Alternatively, a Keep-Alive state may be preconfigured as "true" or "false" for each phone that is in communication with an inside interface of the NAT-SBC 106. If the Keep-Alive state is preconfigured to "true" for the particular end node (e.g., by the end node being part of a Keep-Alive list or by the end node having a separate Keep-Alive variable set to true), the Registration Throttling process may be inhibited (e.g., not initiated) for the end node in operation 303. An example Registration Throttling process is described further below with respect to FIG. 3B.

If the Keep-Alive state for the end node is not preconfigured to true, a Keep-Alive state for the particular end node may be set as "false", if not already preconfigured, in operation 302. For example, the end node may not be part of a list of Keep-Alive type end nodes; may not have a Keep-Alive variable associated with it yet; or may have a Keep-Alive variable associated with it that is preconfigured to "false."

Figure 3B:
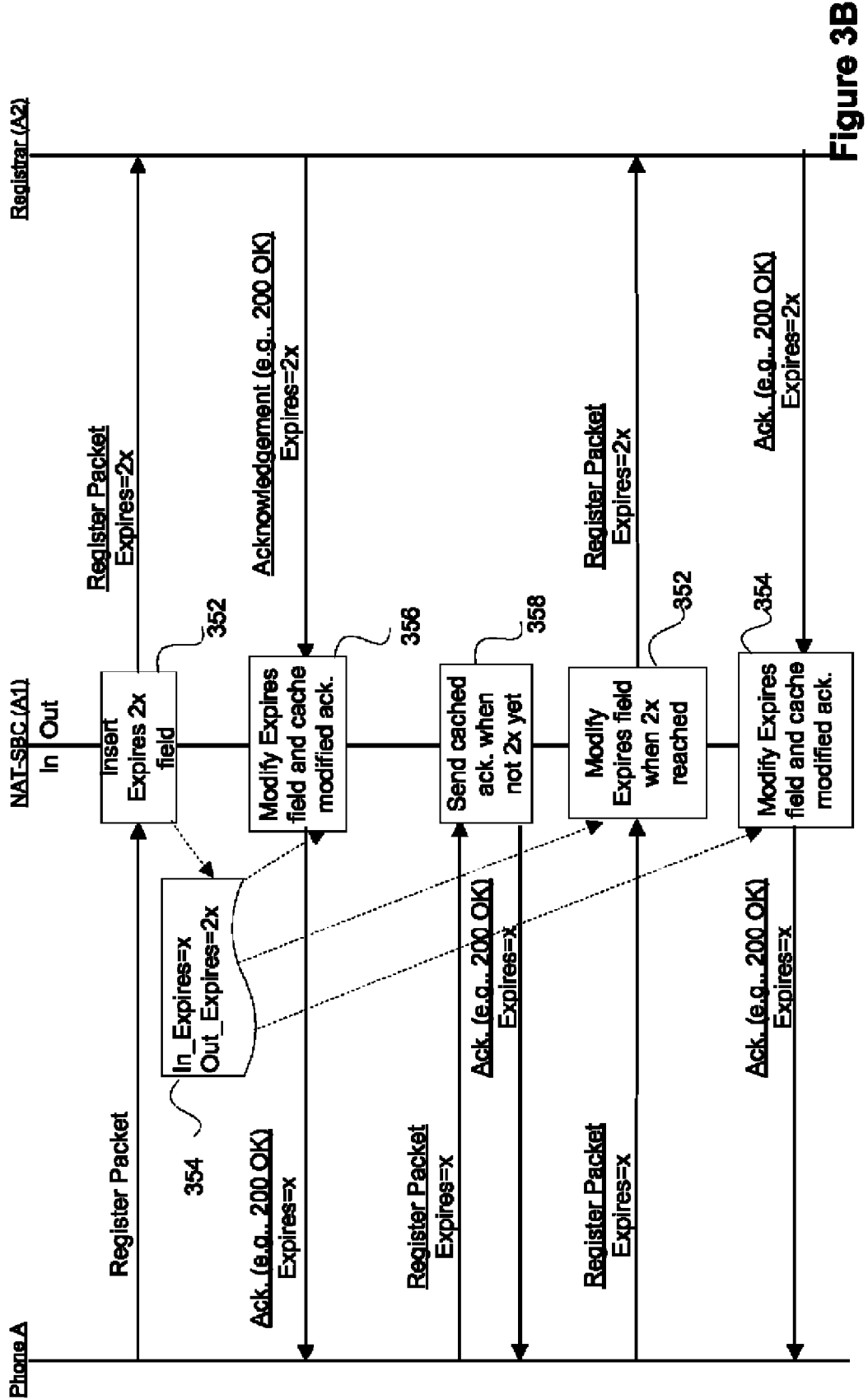
FIG. 3B is a communication diagram illustrating a Registration Throttling mechanism in according with a specific example of the present invention.

A Registration Throttling process may then be initiated for the end node in operation 304. FIG. 3B is a communication diagram illustrating a Registration Throttling mechanism in according with a specific example of the present invention. This throttling mechanism will be illustrated with respect to a register packet sent by phone A. Of course, such throttling mechanisms may be applied to any suitable number of phones.

In this example, the NAT-SBC may be preconfigured with an In_Expires Field equal to X for the inside devices, such as Non-ALG NAT 104a. In this aspect, the NAT-SBC can be configured with a different Out_Expires value, such as 2X, for the registrar. For example, the registrar may need less frequent register packets to be sent to it to keep the sender's session alive, while a more frequent value may be used to force the inside phone A to send more frequent register packets to keep session alive in the Non-ALG NAT. The registrar's actual Out_Expires value may be any suitable value. In the present case, the registrar's Out_Expires value is twice the value used by the end node, phone A. However, the registrar does not have to use whole multiples of end node's value.

Initially, phone A sends a register packet. The NAT-SBC receives the register packet from phone A and inserts the Expires Field 2X into the register packet in operation 352. An association between the In_Expires Field for phone A that is equal to X and the Out_Expires Field that is equal to 2X is stored as binding 354 by the NAT-SBC. A register packet having an Expires Field equal to 2X is then sent to the registrar. The registrar sends an acknowledgement, e.g., 200 OK, having an Expires Field equal to 2X.

The NAT-SBC receives this acknowledgement and modifies the Expires Field (to X) and caches the modified acknowledgement in operation 356. The acknowledgement that is cached can preferably be post translation. In other words, the header has already been translated by the NAT-SBC, as well as any payload. A modified acknowledgement having an Expires Field equal to X is also sent to the phone A.

The Expires of X in the acknowledgement packet is received by phone A. This Expires value of X causes phone A to send frequent register packets, e.g., every X period of time. Thus, when a high frequency value X is used in the acknowledgement packet that is received by the end node, the end node is forced to send frequent register packets through its Non-ALG NAT 104 and thereby cause any bindings corresponding to the register packet (e.g., phone A) to be retained and kept alive by the Non-ALG NAT 104. In other words, the frequent register packets from phone A serve as "keep-alive" packets for a binding of phone A that is retained by the Non-ALG NAT 104.

Referring back to FIG. 3B, when the phone A sends a next register packet with an Expires Field equal to X and the Expires time 2X has not yet being approached, the NAT-SBC sends the cached acknowledgement back to phone A in operation 358. When the 2X time is almost reached and a register packet has been received by the NAT-SBC, this registration packet is then modified and sent to the registrar so that the register packet contains an Expires Field equal to 2X. In one implementation, the register packet is sent if the time that has passed is between X and 2X. The second register packet has been sent at a time between X and 2X so this second register packet is sent to the registrar after modification of the Expires time. The returned acknowledgement with the Expires equal to 2X is then modified and cached in operation 354 by the NAT-SBC. The modified acknowledgement with the 2X Expires field is also sent to the phone A.

If the end node (e.g., phone A) is implementing its own keep-alive mechanism, the Registration Throttling process is not needed and may be stopped. However, mechanisms for ensuring that the end node is consistently providing keep-alive packets may be provided. That is, the Registration Throttling process may be performed until it is determined that the end node is implementing a consistent keep-alive mechanism. Referring to FIG. 3A, after the Registration Throttling is initiated, session packets, except packets used to set up a session, that are sent by the end node to the outside of the SBC-NAT are monitored in operation 306. For example the end node may employ an SIP packet (e.g., Notify) other than the regular call-flow packet (e.g., Register, OK, etc.) to perform the keep-alive mechanism. Thus, session packets from the particular end node that are not used to set up a call or session may be monitored to determine whether particular end node is implementing a keep-alive process.

It may then be determined whether the periodicity or frequency of the monitored packets is equal to or greater than a predetermined amount in operation 308. For example, it may be determined whether the frequency is the same or higher than the preconfigured In_Expires value for the inside devices of the NAT-SBC. If the periodicity is more than a predetermined value, the Keep-Alive state for the end node may be set to "true" in operation 310. Otherwise, if the frequency is less than a predetermined amount, the Keep-Alive state for the end node may be set to "false" in operation 311.

It may then be determined whether the Keep-Alive state for the end node is set to "true" in operation 312. If the Keep-Alive state is set to "true", the Registration Throttling for the end node may be stopped or inhibited in operation 314. In one embodiment, the Registration Throttling is inhibited by stopping the sending of subsequent acknowledgements with a reduced Expires value back to the end node from the NAT-SBC. In FIG. 3B, for example, operations 358 and 354 are not performed. Instead, the acknowledgement from the Registrar may be passed through without modifying the Expires field. Thus, the end node may then send less frequent Register packets. The Expires field of the Register packets from the end node (e.g., phone A) may also remain unmodified.

If the Keep-Alive state is, instead set to "false", the Registration Throttling may continue (or be re-initiated) in operation 304. The dynamic throttling procedure 300 may continue monitoring session packets (that are not used to set up a call) and dynamically turn on and off the Registration Throttling as the end node changes its Keep-Alive capability. For instance, the Registration Throttling is turned off when the end node implements a Keep-Alive process at a certain frequency, and the Registration Throttling is turned back on when the end node then stops implementing such a Keep-Alive process.

Such dynamic throttling embodiments allow efficient functioning of the NAT-SBC. That is, the NAT-SBC minimizes the number of keep-alive type packets by dynamically monitoring the capability of each end node and then adjusting, accordingly, the amount of keep-alive packets that it causes to be produced by the end node. As a result of example dynamic throttling embodiments, resources for processing packets are conserved and bandwidth for message exchanges is also reduced. Embodiments of this dynamic throttling mechanism will also cover scenarios in which someone modifies the SIP User Agent's or phone's configuration to stop the keep-alive packets. Additionally, the registrar would likely receive a reduced number of keep-alive packets from the end node.

After a particular phone has registered, the call signaling and media packets may be handled in any suitable manner. Of course, the throttling mechanisms described above may continue to operate during call flow management. Several embodiments of call signaling management are further described in co-pending U.S. application Ser. No. 11/511, 629, filed 28 Aug. 2006, by Kaushik P. Biswas et al., which application is incorporated herein by reference in its entirety for all purposes.

Figure 4A:
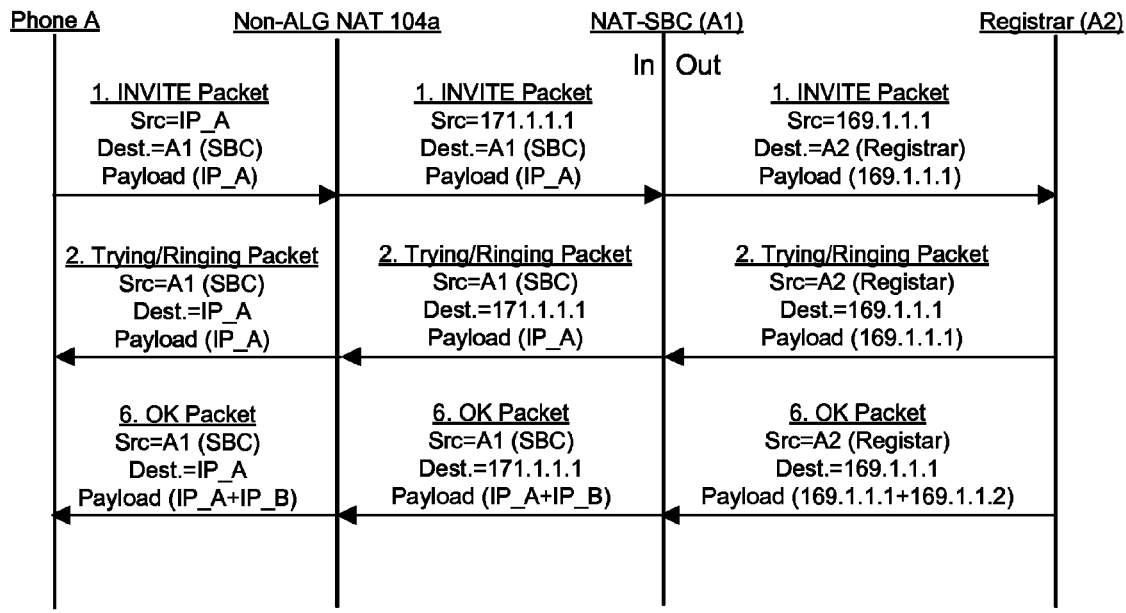
FIGS. 4A through 4C illustrate communication diagrams for a Flow-Around Mode in accordance with a first implementation of the present invention.
Figure 4B:
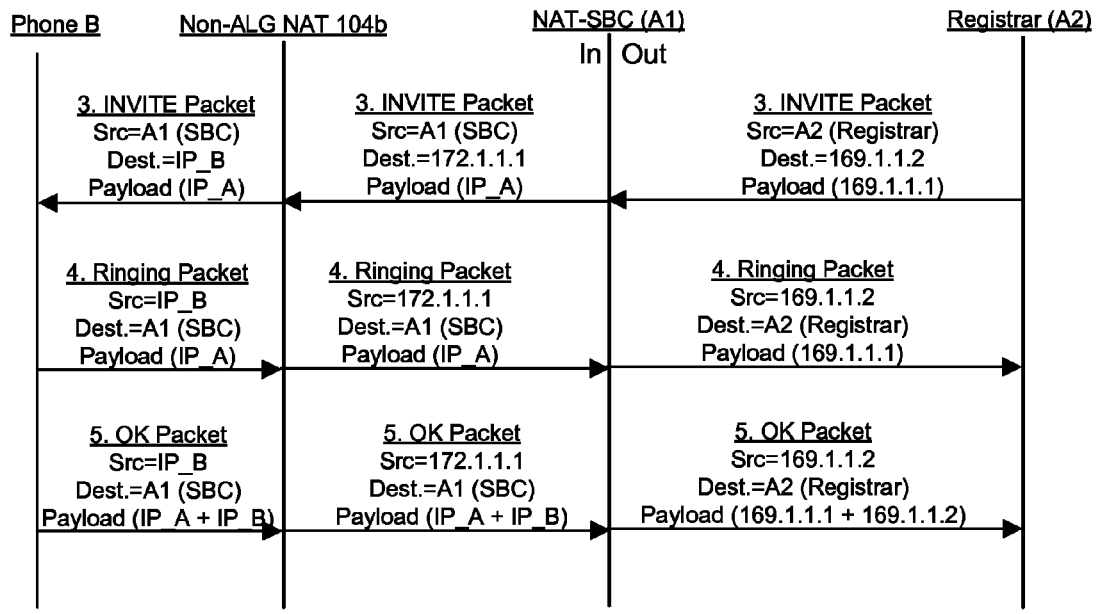
Figure 4C:
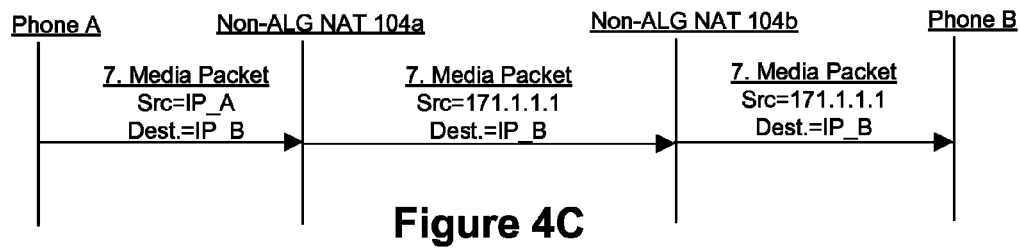
Figure 5A:
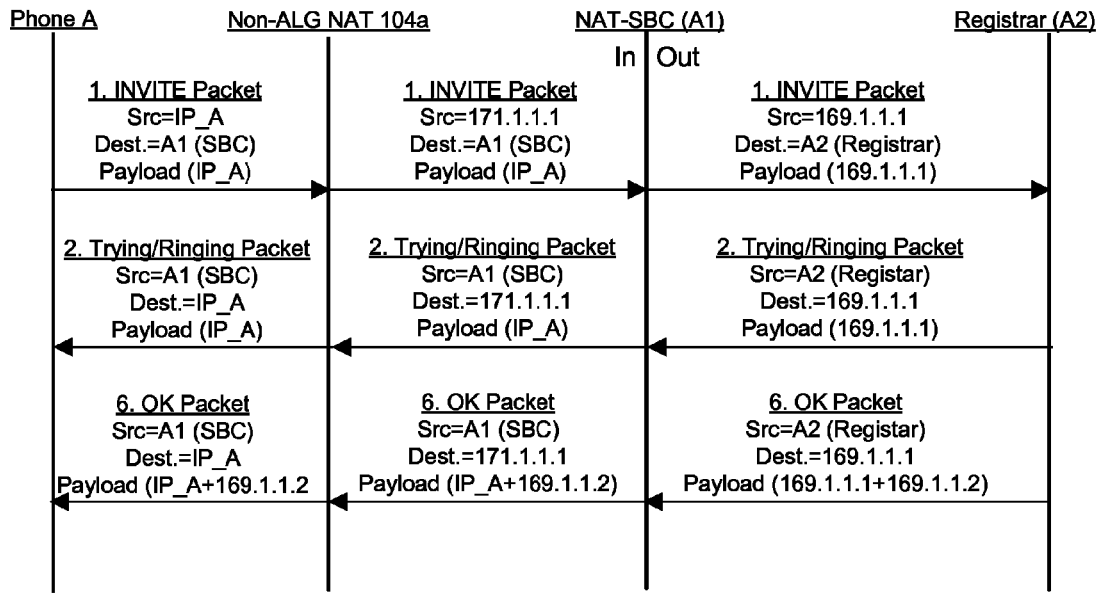
FIGS. 5A through 5C illustrate communication diagrams for a Flow-Through Mode in accordance with a second implementation of the present invention.
Figure 5B:
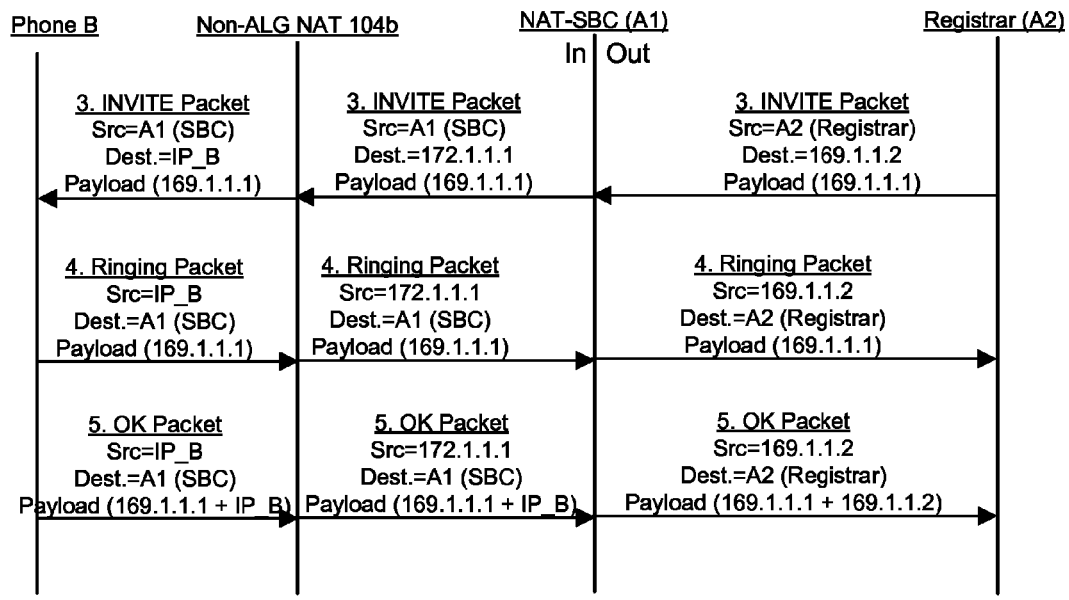
Figure 5C:
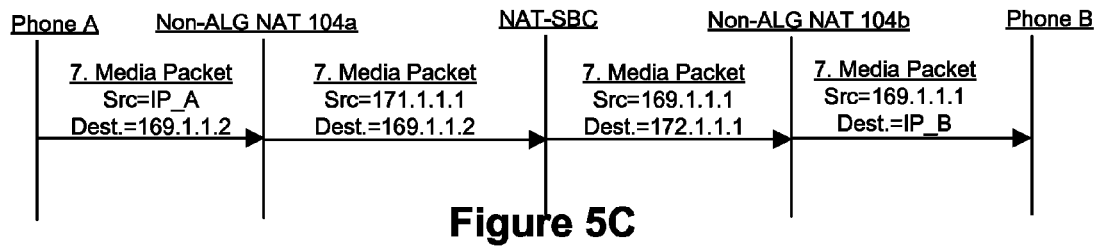
Figure 6:
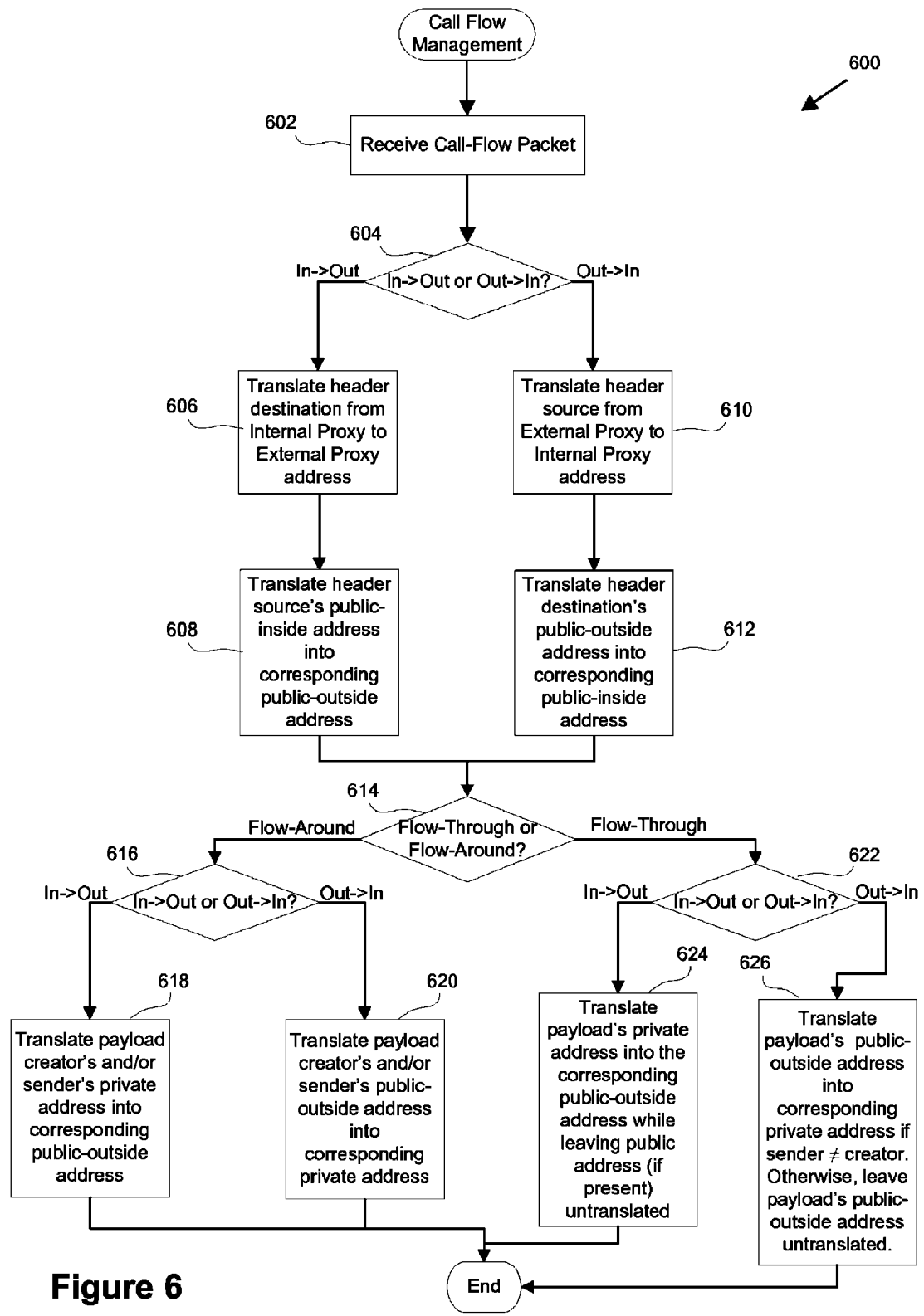
FIG. 6 is a flow chart illustrating a call flow management procedure for handling two modes in accordance with one embodiment of the present invention.

After a particular phone has registered, the call signaling and media packets may be handled in two different approaches. Of course, the throttling mechanisms described above may continue to operate during call flow management. FIGS. 4A through 4C illustrate communication diagrams for a Flow-Around Mode, while FIGS. 5A through 5C illustrate communication diagrams for a Flow-Through Mode in accordance with two implementations of the present invention. FIG. 6 is a flow chart illustrating a call flow management procedure 600 for handling both modes in accordance with one embodiment of the present invention. Both communication diagrams will be described in conjunction with the flow of FIG. 6.

Referring to FIG. 4A, phone A initially sends an INVITE packet in step 1 having a source equal to IP_A, a destination address equal to A1, and private address IP_A for phone A within the payload. This INVITE packet is received by a Non-ALG NAT 104a that translates the header. Accordingly, the INVITE packet sent out from Non-ALG NAT 104a contains a translated source address equal to 171.1.1.1. The NAT-SBC recognizes the source address 171.1.1.1 as a public-inside address for phone A.

Referring to FIG. 6, the call flow packet (e.g., INVITE packet) is received in operation 602 by the NAT-SBC. It is then determined whether the packet is going from the inside to the outside, or from the outside to the inside in operation 604. In the present example of the INVITE packet, the INVITE packet is going from the inside to the outside with respect to the NAT-SBC. Accordingly, the header destination address is translated from the internal proxy to the external proxy address in operation 606. As shown is FIG. 4A, the destination address is translated from the internal proxy address A1 to the external proxy address A2. Referring back to FIG. 6, the header source public-inside address is translated into a corresponding public-outside address in operation 608. Thus, as shown in FIG. 4A, the header source address is translated from public-inside address 171.1.1.1 to public-outside address 169.1.1.1.

In handling the different modes, the NAT-SBC then may determine whether Flow-Through or Flow-Around Mode is being implemented in operation 614. This determination may utilize any suitable mechanism. In one implementation, the NAT-SBC is configured with particular modes for all devices or a subset of devices. A Flow-Through mode may be configured when two inside phones share a same domain and possible a same private address. For instance, when phone A shares a same domain 10.1.1.1/x with phone B, the Flow-Through mode may be used. When phone A and Phone B have unique domains with respect to each other, they may implement a Flow_Around mode as described further below.

In the example of FIGS. 4A~4C, a Flow-Around Mode is being implemented. Thus, after translation of the header, the NAT-SBC may again determine whether the packet is flowing from the inside to the outside or visa versa in operation 616. The INVITE packet of step 1 is flowing from the inside to the outside of the NAT-SBC. Accordingly, the private address for the creator and/or the private address for the sender of the packet that is in the payload are translated into the corresponding public-outside address in operation 618.

The creator is defined as the originator of the payload address. In an SIP example, phone A creates the initial INVITE payload with its own address IP_A in step 1 and this INVITE is sent to phone B by the registrar in step 3. Phone B returns at least a portion of the same payload having phone A's address in the Ringing and OK packet in steps 2, 4, 5, and 6. The Registrar also returns the address for phone A that was initially generated or created by phone A in the payload of a Trying packet in step 2. Thus, in these packet examples, the payload address that corresponds to phone A was created by phone A since phone A generated the initial INVITE. While phone A sends the initial INVITE packet in steps 1 and 3, phone B or the registrar sends the other packets in steps 2, 4, 5, and 6. Phone B is the creator and sender of the payload address for itself in the OK packet of steps 5 and 6. For each particular packet, the creator of an address may be simply determined to be the phone that corresponds to the particular address, while the sender is determined from the source address of the header.

In the INVITE example of step 1 of FIG. 4A, the private address IP_A corresponds to both the creator and the sender of the packet, i.e., phone A. Thus, this private address IP_A for the creator and the sender is translated into the public-outside address 169.1.1.1.

This translated INVITE packet is then received by the registrar. The registrar may then send back a Trying or Ringing Packet in step 2 of FIG. 4A. This packet has a source address equal to A2 and a public-outside address 169.1.1.1 for the destination address, as well as the payload. In this example, the payload public-outside address corresponds to the creator of the original INVITE packet, phone A. This Trying or Ringing Packet is then received by the NAT-SBC from the outside and destined for the inside interface of the NAT-SBC. Thus, the header source is translated from the external proxy to the internal proxy address in operation 610. The header destinations public-outside address is also translated into the corresponding public-inside address in operation 612.

Additionally, the payload creator address is translated from the public-outside address into the corresponding private address for the creator (i.e., phone A) in operation 620 for the Flow-Around Mode. Thus, the Trying or Ringing Packet output by the NAT-SBC has a source address equal to A1, and a destination address equal to 171.1.1.1 for phone A, and a creator's address in the payload equal to IP_A for phone A. The Non-ALG NAT 104A then receives this Trying or Ringing Packet and translates only the header and does not have to translate the embedded address for phone A. The Trying or Ringing Packet received by phone A then has a source address equal to A1 and a destination address equal to IP_A.

In the meantime, the registrar also sends an INVITE packet towards phone B in step 3 which is illustrated in FIG. 4B. This INVITE packet has a source address equal to A2 and a destination address equal to 169.1.1.2, which corresponds to phone B. The payload has the public-outside address for phone A, which is equal to 169.1.1.1.

When the NAT-SBC receives this INVITE packet, it is going from the outside to the inside in a Flow-Around Mode. Accordingly, the header source is translated from an external proxy to internal proxy address in operation 610 and the header destination's public-outside address for phone B is translated into the corresponding public-inside address in operation 612. As shown, the translated INVITE packet has a source address equal to A1 and a destination address equal to 172.1.1.1, which corresponds to phone B. The NAT-SBC also translates the payload's public-outside address for the creator (i.e., phone A) of such payload into a corresponding private address IP_A. Phone B will, accordingly, obtain phone A's private address IP_A in the payload. The Non-ALG NAT 104b then translates only the header so that it has a source address equal to A1 and a destination address equal to IP_B and forwards this translated packet to phone B.

In a step 4, phone B sends a Ringing packet having a source address equal to IP_B and a destination address equal to A1, as well as the private address IP_A for phone A in the payload towards the NAT-SBC. This Ringing packet has its header translated by the Non-ALG NAT 104b so that it contains a source address equal to 172.1.1.1 and a destination address equal to A1. The NAT-SBC then translates the header destination from the internal proxy to the external proxy address in operation 606 and translates the header sources public-inside address into the corresponding public-outside address in operation 608.

The NAT-SBC also translates the payload private address for the payload creator (i.e., phone A) into a corresponding public-outside address in operation 618. Accordingly, the Ringing packet sent out by the NAT-SBC has a source address equal to 169.1.1.2, which corresponds to phone B, a destination address equal to A2 which corresponds to the registrar, and a public-outside address 169.1.1.1 in the payload which corresponds to phone A. This Ringing packet in step 4 corresponds to the Ringing packet that is received by phone A in step 2.

In step 5, phone B is ready to communicate and sends an OK packet having a source address equal to IP_B, a destination equal to A1, as well the private address for phone A and phone B in the form of IP_A and IP_B, respectively. The Non-ALG NAT 104B translates the header so that source address is equal to and the destination address is equal to A1. The payload remains untranslated.

The NAT-SBC then receives this OK packet and translates the header in accordance with operations 606 and 608 of FIG. 6 and the payload in accordance with operation 618 of FIG. 6. Accordingly the OK packet has a source address equal to 169.1.1.2 and a destination address equal to A2, and public-outside addresses for both phone A and phone B which are equal to 169.1.1.1 and 169.1.1.2, respectively, which packet is received by the registrar.

The registrar then forwards this OK packet towards phone A as shown in FIG. 4A. The NAT-SBC then translates the header and payload in accordance with operation 610, 612, and 620 of FIG. 6. Accordingly, the OK packet in step 6 output from the NAT-SBC has a source address equal to A1, and a destination address equal to 171.1.1.1 which corresponds to phone A, as well as private addresses for both phone A and phone B in the payload in the form of IP_A and IP_B, respectively. The Non-ALG NAT 104A then translates only the header so that the source address is equal to A1 and the destination address is equal to IP_A.

Phone A and phone B then know each other by their corresponding private addresses IP_A and IP_B. Thus, they communicate with each other using these private addresses. As shown in FIG. 4C, phone A sends a media packet in step 7 having a source address IP_A and destination address equal to IP_B towards phone B. Phone A's Non-ALG NAT 104a translates the source address from IP_A to 171.1.1.1. The Non-ALG NAT 104b of phone B receives this media packet and forwards it to phone B in accordance with normal routing procedures. Non-ALG NAT 104a of phone A is also aware of the destination address IP_B of phone B via conventional routing discovery mechanisms.

Turning to FIGS. 5A through 5C, the Flow-Through Mode will now be illustrated. Initially in step 1, phone A sends an INVITE packet having a source address equal to IP_A, a destination address equal to A1, and it's private address IP_A contained within the payload. The Non-ALG NAT 104a merely translates the header so that the source address is now 171.1.1.1, which corresponds to the public-inside address for phone A with respect to the NAT-SBC.

The NAT-SBC then translates the header destination from the internal proxy to the external proxy address in operation 606, so that it is translated from A1 into the address A2. The NAT-SBC also translates the header sources public-inside address 171.1.1.1 into the corresponding public-outside address 169.1.1.1 for phone A in operation 608.

In the Flow-Through Mode when the packet is going from the inside to the outside, the NAT-SBC also translates the payload's private address into the corresponding public-outside address while leaving any public addresses untranslated (if present in the payload) in operation 624. In the INVITE example of step 1, the payload contains the sender's (i.e., phone A is the sender) private address IP_A which is translated into the corresponding public-outside address 169.1.1.1 for the sender or phone A. In the remaining steps, translation of the header will not be explained since it is similar to the operations of FIG. 4A-4C and merely the payload translations will be described. In the other inside to outside example, the NAT-SBC receives an OK packet having a private address for phone B and a public-outside address for phone A. In operation 624, the private address IP_B is translated to the corresponding public-outside address 169.1.1.1 while the public-outside address for phone A remains untranslated.

When the NAT-SBC receives a packet going from the outside to the inside, it translates the payload's public-outside address into the corresponding private address if the creator of such address (or payload portion) does not equal the sender of such packet in operation 626. Otherwise, the payload's public-outside address is left untranslated if the creator of such address is the same as the sender of such packet. The Trying/Ringing packet received in step 2 by the NAT-SBC contains a public-outside address 169.1.1.1 that was created by phone A but is being sent by phone B. Thus, the creator of this address does not equal the sender and will be translated into the corresponding private address in operation 626. Accordingly, the Trying and Ringing packet in step 2 sent out by the NAT-SBC contains a payload having a private address IP_A corresponding to phone A which corresponds to the creator of such address or payload portion.

Steps 3 illustrates another outside to inside packet example for payload translation handling by the NAT-SBC. In FIG. 5B, when the NAT-SBC receives the INVITE packet from the registrar that is destined for phone B in step 3, the public-outside address 169.1.1.1 remains untranslated since the creator of such address (phone A) is equal to the sender of the packet (phone A) in operation 626. Thus, the INVITE packet output from the NAT-SBC in step 3 has a public-outside address 169.1.1.1 for phone A in the payload. Phone B will then become aware of phone A's public-outside address.

In step 4, the Ringing packet sent by phone B contains a public-outside address 169.1.1.1 for phone A in the payload and is going from inside to outside. The NAT-SBC does not translate the payload address since it is a public address going from inside to outside in operation 624.

When phone B sends an OK packet in step 5, it will contain the public-outside address for phone A and a private address for itself. Thus, NAT-SBC will receive the OK packet for phone B having a public-outside address 169.1.1.1 for phone A and a private address IP_B for phone B in the payload. Since this packet is going from the inside to the outside, the payload's private address IP_B will be translated into the corresponding public outside address 169.1.1.2 while the public-outside address 169.1.1.1 will remain untranslated in operation 624.

When this OK packet is being returned to phone A and received by NAT-SBC in step 6, the payload contains the public-outside addresses for both phone A and phone B. In operation 626, since the creator of the public-outside address 169.1.1.1 does not equal the sender of this packet, this public-outside address is translated into the corresponding private address IP_A. Since the creator of the other public-inside address 169.1.1.2 does equal the sender of such packet, this address 169.1.1.2 remains untranslated as 169.1.1.2 for phone B. Accordingly, phone A is made aware of phone B's public outside address 169.1.1.2.

Phone A and phone B can then communicate using each other's public-outside addresses. As shown in FIG. 5C, phone A sends a media packet in step 7 having a source address equal to IP_A and a destination address equal 169.1.1.2, which corresponds to phone B's public-inside address. The Non-ALG NAT 104a for phone A then translates the private source address IP_A into a public-inside address 171.1.1.1 for phone A and leaves the destination public-outside address for phone B alone. The NAT-SBC then translates the public-inside source address 171.1.1.1 for phone A into the corresponding public-outside address 169.1.1.1 for phone A. The destination address for phone B is translated from public-outside address 169.1.1.2 to the public-inside address 171.1.1.2 for phone B, which is recognizable by the Non-ALG NAT 104*b* for phone B. The Non-ALG NAT 104*b* then translates the destination public-inside address 171.1.1.2 into a private address IP_B for phone B. These header translations of the NAT-SBC are illustrated by operations 606, 608, 612, and 612 of FIG. 6.

Generally, the techniques of the present invention for handling session data may be implemented on software and/or hardware. For example, these techniques can be implemented in an operating system kernel, in a separate user process, in a library package bound into network applications, on a specially constructed machine, or on a network interface card. In a specific embodiment of this invention, some of the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the data processing systems (e.g., host) may each be implemented on a general-purpose network host machine such as a personal computer or workstation. Further, the invention may be at least partially implemented on a card (e.g., an interface card) for a network device or a general-purpose computing device.

Figure 7:
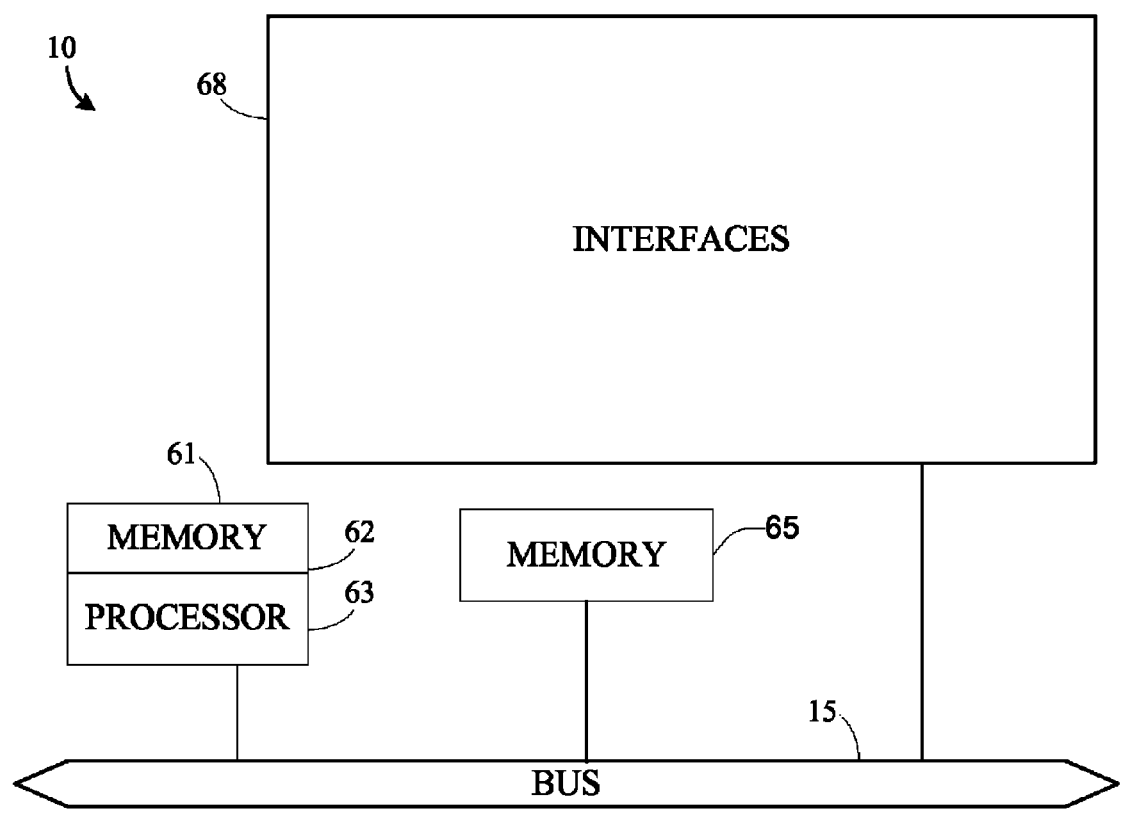
FIG. 7 is a diagrammatic representation of a router in which embodiments of the present invention may be implemented.

Referring now to FIG. 7, a router 10 suitable for implementing embodiments of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for translation, binding formation and storage, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, bindings, Keep-Alive states, periodicity information for monitored session packets, Flow-Through and/or Flow-Around configurations, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of handling session packets in a first intermediary node that is configured to provide network address translation (NAT) having an inside interface coupled with a second intermediary node that is also configured to perform NAT, comprising:

(a) at the first intermediary node, determining whether an end node that is coupled with an inside interface of the second intermediary node is sending keep-alive messages that cause a binding corresponding to the end node to be retained by the second intermediary node, wherein the binding associates inside and outside addresses of the end node; and (b) initiating, continuing, or inhibiting a process, for the first intermediary node to cause keep-alive messages for the end node to be sent from the end node at a frequency so as to cause the binding for the end node to be retained by the intermediary node, based on whether or how frequently the end node is currently sending its keep-alive messages.

2. The method as recited in claim 1, wherein the process for the intermediary node to cause keep-alive messages to be sent is inhibited when the first intermediary node has been preconfigured to specify that the end node is capable of sending keep-alive packets that result in a binding that was formed by the second intermediary node being retained.

3. The method as recited in claim 1, wherein the process for the intermediary node to cause keep-alive messages to be sent is inhibited when it is determined that the end node is sending keep-alive messages at or above a predefined frequency that corresponds to the binding being retained by the second intermediary device.

4. The method as recited in claim 3, wherein operations (a) and (b) are continuously performed so as to dynamically adjust the process for the first intermediary device to cause keep-alive messages to be sent when the end node changes its sending of keep-alive messages.

5. The method as recited in claim 3, wherein an inside expiration field, that indicates an expiration time for the second intermediary node and an outside expiration time for a registrar node are provided for the first intermediary node to use, and wherein the process for the first intermediary device to cause keep-alive messages to be sent is accomplished by:

(i) at the first intermediary node, receiving a first register packet sent from the end node to the registrar node;

(ii) forwarding the first register packet from the first intermediary node towards the registrar node after translating the header and payload of the first register packet and including the outside expiration time in the first register packet;

(iii) at the first intermediary node, receiving an acknowledgement packet, having the outside expiration time therein, sent from the registrar node to the end node in response to the first register packet;

(iv) forwarding the acknowledgement packet from the first intermediary node towards the end node after translating the header and the payload of the acknowledgement packet and replacing the outside expiration time of the acknowledgment with the inside expiration time, (v) caching the translated acknowledgement packet at the first intermediary node; and (vi) when a subsequent register packet is received from the end node at the intermediary node, (a) sending the cached, translated acknowledgement packet to the end node and (b) forwarding the subsequent register packet from the first intermediary node towards the registrar node after translating the header and payload of the first register packet and including the outside expiration time in the first register packet only if a duration of time that has expired approaches the outside expiration time.

6. The method as recited in claim 5, wherein the process for the first intermediary device to cause keep-alive messages to be sent is inhibited by inhibiting modification of an expires field of any acknowledgement packet that is sent from the first intermediary node to the end node so as to not cause the end node to alter a frequency at which the end node sends subsequent register packets.

7. The method as recited in claim 6, wherein the process for the first intermediary device to cause keep-alive messages to be sent is further inhibited by inhibiting modification of an expires field of any register packet that is forwarded by the intermediary node to the registrar node.

8. The method as recited in claim 6, wherein the inside expiration time for the second intermediary node is less than the outside expiration time for the registrar node.

9. A first intermediary apparatus comprising:
one or more processors;
one or more memory, wherein at least one of the processors and memory are adapted for:
performing network address translation (NAT) and has an inside interface coupled with a second intermediary apparatus that is configured to perform NAT;
determining whether an end node that is coupled with an inside interface of the second intermediary node is sending keep-alive messages that cause a binding corresponding to the end node to be retained by the second intermediary node, wherein the binding associates inside and outside addresses of the end node; and
initiating, continuing, or inhibiting a process, for the first intermediary node to cause keep-alive messages for the end node to be sent from the end node at a frequency so as to cause the binding for the end node to be retained by the intermediary node, based on whether or how frequently the end node is currently sending its keep-alive messages.

10. The first intermediary apparatus as recited in claim 9, wherein the process for the intermediary node to cause keep-alive messages to be sent is inhibited when the first intermediary node has been preconfigured to specify that the end node is capable of sending keep-alive packets that result in a binding that was formed by the second intermediary node being retained.

11. The first intermediary apparatus as recited in claim 9, wherein the process for the intermediary node to cause keep-alive messages to be sent is inhibited when it is determined that the end node is sending keep-alive messages at or above a predefined frequency that corresponds to the binding being retained by the second intermediary device.

12. The first intermediary apparatus as recited in claim 9, wherein the at least one of the processors and memory are adapted for continuously performing operations (a) and (b) so as to dynamically adjust the process for the first intermediary device to cause keep-alive messages to be sent when the end node changes its sending of keep-alive messages.

13. The first intermediary apparatus as recited in claim 12, wherein an inside expiration field, that indicates an expiration time for the second intermediary node and an outside expiration time for a registrar node are provided for the first intermediary node to use, and wherein the process for the first intermediary device to cause keep-alive messages to be sent is accomplished by:

(i) at the first intermediary node, receiving a first register packet sent from the end node to the registrar node;

(ii) forwarding the first register packet from the first intermediary node towards the registrar node after translating the header and payload of the first register packet and including the outside expiration time in the first register packet;

(iii) at the first intermediary node, receiving an acknowledgement packet, having the outside expiration time therein, sent from the registrar node to the end node in response to the first register packet;

(iv) forwarding the acknowledgement packet from the first intermediary node towards the end node after translating the header and the payload of the acknowledgement packet and replacing the outside expiration time of the acknowledgment with the inside expiration time, (v) caching the translated acknowledgement packet at the first intermediary node; and (vi) when a subsequent register packet is received from the end node at the intermediary node, (a) sending the cached, translated acknowledgement packet to the end node and (b) forwarding the subsequent register packet from the first intermediary node towards the registrar node after translating the header and payload of the first register packet and including the outside expiration time in the first register packet only if a duration of time that has expired approaches the outside expiration time.

14. The method as recited in claim 13, wherein the process for the first intermediary device to cause keep-alive messages to be sent is inhibited by inhibiting modification of an expires field of any acknowledgement packet that is sent from the first intermediary node to the end node so as to not cause the end node to alter a frequency at which the end node sends subsequent register packets.

15. The first intermediary apparatus as recited in claim 14, wherein the process for the first intermediary device to cause keep-alive messages to be sent is further inhibited by inhibiting modification of an expires field of any register packet that is forwarded by the intermediary node to the registrar node.

16. The first intermediary apparatus as recited in claim 13, wherein the inside expiration time for the second intermediary node is less than the outside expiration time for the registrar node.

17. A machine readable storage medium, volatile or nonvolatile, configured with program instructions for handling session packets in a first intermediary node that is configured to provide network address translation (NAT) having an inside interface coupled with a second intermediary node that is also configured to perform NAT, the program instructions being configured for:

(a) at the first intermediary node, determining whether an end node that is coupled with an inside interface of the second intermediary node is sending keep-alive messages that cause a binding corresponding to the end node to be retained by the second intermediary node, wherein the binding associates inside and outside addresses of the end node; and (b) initiating, continuing, or inhibiting a process, for the first intermediary node to cause keep-alive messages for the end node to be sent from the end node at a frequency so as to cause the binding for the end node to be retained by the intermediary node, based on whether or how frequently the end node is currently sending its keep-alive messages.

* * * * *